No. 791,433. PATENTED MAY 30, 1905.
G. F. WACHTERSHAUSER.
FIRE ESCAPE.
APPLICATION FILED JAN. 5, 1905.
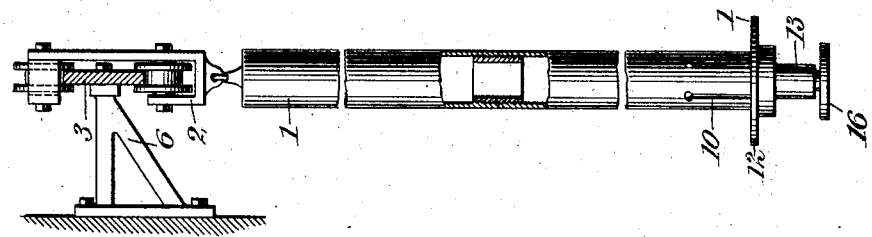
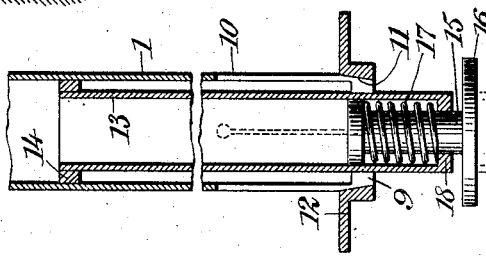
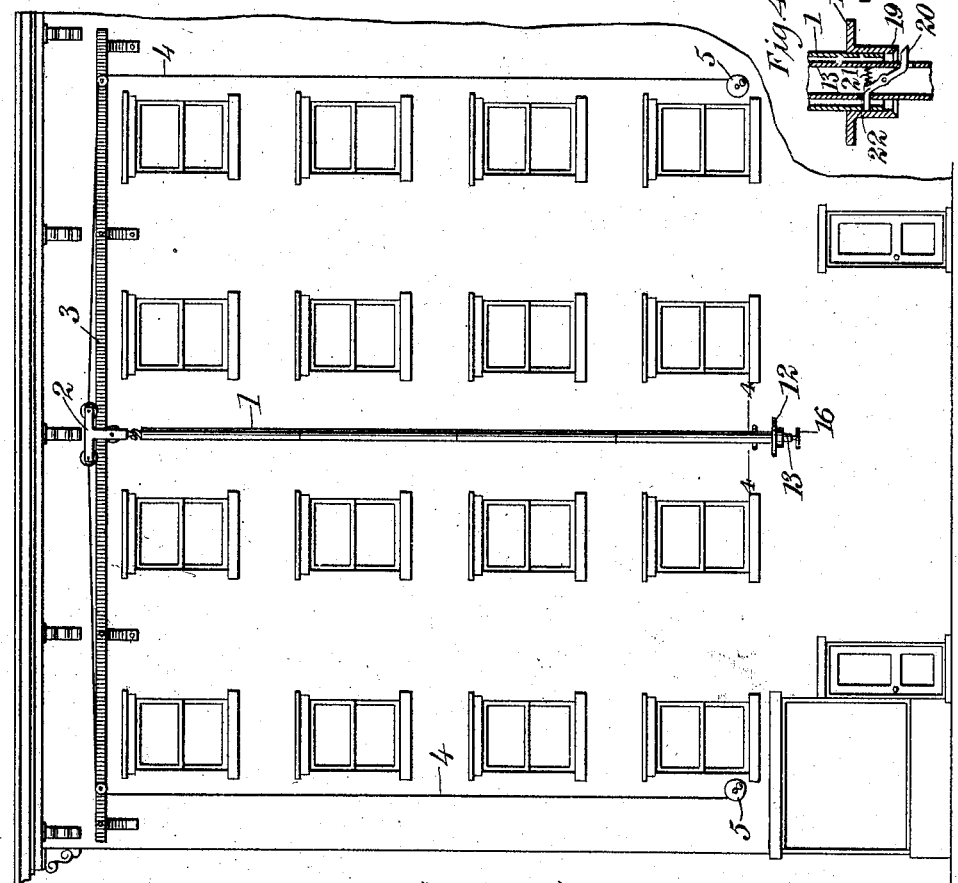
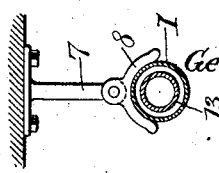
WITNESSES:
Edward Thorpe
A. E. Fay
INVENTOR
George F. Wachtershauser
BY Munn & Co.
ATTORNEYS No. 791,433. Patented May 30, 1905.

UNITED STATES PATENT OFFICE.

GEORGE F. WACHTERSHAUSER, OF WILKESBARRE, PENNSYLVANIA.

FIRE-ESCAPE.

SPECIFICATION forming part of Letters Patent No. 791,433, dated May 30, 1905.

Application filed January 5, 1905. Serial No. 239,752.

*To all whom it may concern:*

Be it known that I, GEORGE F. WACHTERSHAUSER, a citizen of the United States, and a resident of Wilkesbarre, in the county of Luzerne and State of Pennsylvania, have invented a new and Improved Fire-Escape, of which the following is a full, clear, and exact description.

My invention relates to fire-escapes, and has for its objects to provide a fire-escape which shall be easily accessible from all parts of the building, which shall take up very little room, shall have few parts to get out of repair, which shall secure a rapid descent and a cushioned fall near the ground, and which shall be simple and cheap to construct.

Reference is to be had to the accompanying drawings, forming a part of this specification, in which similar characters of reference indicate corresponding parts in all the figures.

Figure 1 represents a building with my improved fire-escape attached. Fig. 2 represents a preferred form of my device upon an enlarged scale, with parts broken away and in section. Fig. 3 is a longitudinal sectional view of a preferred form of my invention, showing a second position with certain parts in dotted lines. Fig. 4 is a sectional view on the line 4 4 of Fig. 1, showing a modification which comes within the scope of my invention; and Fig. 5 shows a spring-clamp intended to be used with the other parts of my invention.

In the drawings, 1 represents a tubular casing formed of one or more sections, as desired, 2 a carriage from which this casing is adapted to be suspended, and 3 a track upon which the carriage is intended to roll. The track is secured to the building near the top. A pair of cables 4 4 or other flexible connections are attached to the carriage and run over pulleys to windlasses 5 5, operating to change the position of the fire-escape in an obvious manner. It will be seen that the cables 4 4 may be reached from any of the side windows and operated to draw the fire-escape into the desired position.

7 and 8 represent two parts of a spring-clamp fastened onto the building at any desired point for the purpose of holding the tubular casing stationary when not in use. The two jaws 8 of this clutch are operated by a spring in an obvious manner to perform the desired function.

Upon the bottom of the casing 1 and extending inwardly are a plurality of projections 9, and the casing is provided at the lower end with several slits 10 and with inclined surfaces 11. These slits are provided for the purpose of allowing the lower end of casing to be forced inwardly to a slight extent and to hold the inner tube 13 normally in position by reason of the resiliency of the portions of the casing between the slits. Upon the lower end of the casing is placed a platform 12, which is held in position by the resiliency of these lower portions of the casing and is adapted to remain in the position shown in full lines in the figures until caused to descend by the weight of a person sliding down the casing. The casing is provided with a slidable member or inner tube 13, which is provided at its upper end with a collar 14, adapted upon the descent of the tube 13 to come into contact with the projections 9 in order to prevent the tube 13 from falling out of the casing.

Within the lower end of the tube 13 is placed a stud 15, having a projection 16 and supported by a spring 17 upon an inwardly-extending ring 18 on the bottom of the tube.

It will be obvious that when a person slides down the casing 1 his feet will strike the platform 12, disengage it from the casing, and it in its descent will strike the projection 16 and pull the inner tube 13 down until the projections 14 strike the projections 9. This will suddenly arrest the descent of the tube, but the projection 16 and stud 15 will be allowed to have a slight movement in addition, which will be cushioned by the spring 17.

In Fig. 4 the casing 1 and the tube 13 are shown as of substantially the same construction as those shown in the other figures. The platform 12, however, is provided with a downwardly-extending ring 19, and a lever 20 is secured in the tube 13, passing through a hole 22 in its side. This lever acts to prevent the tube 13 from descending in the casing 1 until the projecting ring 19 strikes the end of the lever 20, which will in an apparent manner unlock the tube and allow it to descend. A spring 21 is used to normally force the lever into locking position.

It will be evident that other modifications may be made in the construction shown in Figs. 1, 2, 3, and 5 without departing from the spirit of my invention as set forth in the claims, and I do not wish to be limited to the exact construction as shown.

Having thus described my invention, I claim as new and desire to secure by Letters Patent—

1. A fire-escape comprising a hollow casing, a platform removably supported on said casing, and a member slidingly located in said casing and projecting therefrom in the path of the platform.

2. A fire-escape comprising a movable carriage, a casing suspended therefrom, a platform removably supported on the lower end of said casing, and a member slidingly located in the lower end of said casing and adapted to receive said platform.

3. A fire-escape comprising a track, a carriage movably mounted thereon, a hollow casing suspended from said carriage, and a member sliding in said casing and projecting from its lower end.

4. A fire-escape comprising a track, a carriage movably mounted thereon, means for moving said carriage on the track comprising a flexible connection and a windlass, a hollow casing suspended from said carriage, and a member sliding in said casing and projecting from the lower end thereof.

5. A fire-escape comprising a hollow casing, a member located in said casing, a projection on said member outside the casing, and means for preventing the member from sliding out of the casing.

6. In a fire-escape, the combination of a hollow casing, a platform removably supported on its end, a member located in said casing and adapted to receive the platform, and means for temporarily holding said member within the casing and permitting it to be moved therein.

7. In a fire-escape, the combination of a hollow casing, a platform removably supported on its end, a member located in said casing, a projection on said member extending into the path of said platform, and a yielding connection between said projection and said member.

8. In a fire-escape, the combination of a vertical tubular casing, a tubular member capable of sliding therein, resilient inwardly-extending tongues on said casing coacting with said member to normally retain it within the casing, and means for positively preventing said member from dropping entirely out of the casing.

9. In a fire-escape, the combination of a vertical tubular casing having slits and inwardly-projecting resilient tongues at its lower end, a member slidingly mounted therein, a projection on the lower end of said member, and a resilient connection between said projection and said member.

10. In a fire-escape the combination of a hollow casing, a member slidingly mounted therein, means for preventing said member from sliding entirely out of said casing, a spring supported by said member, and a projection extending from the lower end of said member supported by said spring.

11. A fire-escape comprising a main member, an extension member arranged in slidable relation with said main member, and an element connected with said main member and adapted for receiving a body moving along said main member and transferring such body to said extension member.

12. A fire-escape comprising a main member, an extension member movable beyond the end of said main member, and a cushion device arranged in connection with said extension member.

13. The combination of a main member, an extension member slidably connected with said main member, a platform removably supported by said main member, a projection on said extension member arranged in line with said platform, and a cushioning device connected to said extension member.

14. A fire-escape comprising a main member, a platform detachably mounted thereon, and movable means for receiving the platform from the main member.

15. A fire-escape comprising a main member, a platform detachably mounted thereon, and movable means normally mounted on the main member for receiving the platform when detached from the main member.

16. A fire-escape comprising a main member, a platform detachably mounted thereon, and movable means for receiving the platform from the main member; said movable means being provided with a projection resiliently mounted thereon.

17. A fire-escape comprising a tubular main member having longitudinal slits and inwardly-projecting resilient tongues adjacent to said slits, and means movably mounted within said main member and engaged by said tongues for receiving a weight from the main member.

18. In a fire-escape, the combination of a track, a carriage movably mounted thereon, a main member connected with the carriage, a platform detachably mounted upon the main member, and movable means for receiving the platform from the main member.

19. In a fire-escape, the combination of a track, a carriage movably mounted thereon, a main member connected with the carriage and supported thereby, a platform detachably mounted on the main member, a movable member connected with the main member, and a projection movably and resiliently connected with the movable member for receiving the platform from the main member.

In testimony whereof I have signed my name to this specification in the presence of two subscribing witnesses.

GEORGE F. WACHTERSHAUSER.

Witnesses:
A. GOTTHOLD,
M. J. MULVEY.